United States Patent [19]

Josefson et al.

[11] 4,191,624

[45] Mar. 4, 1980

[54] ELECTRODEPOSITION OF HIGH MOLECULAR WEIGHT COPOLYMERS

[75] Inventors: Arnold J. Josefson, Park Ridge; Loren R. Munson, Libertyville, both of Ill.

[73] Assignee: DeSoto, Inc., Des Plaines, Ill.

[21] Appl. No.: 840,033

[22] Filed: Oct. 6, 1977

[51] Int. Cl.$^2$ ............. C25D 13/16; C25D 13/20
[52] U.S. Cl. ............. 204/181 T; 204/181 R
[58] Field of Search ............. 204/181 R, 181 T

[56] References Cited

U.S. PATENT DOCUMENTS

| | | | |
|---|---|---|---|
| 3,547,788 | 12/1970 | Tanaka et al. | 204/181 T |
| 3,663,383 | 5/1972 | Matsuda et al. | 204/181 T |
| 3,862,075 | 1/1975 | Sekmakas | 204/181 R |

*Primary Examiner*—Howard S. Williams
*Attorney, Agent, or Firm*—Dressler, Goldsmith, Clement, Gordon & Shore, Ltd.

[57] ABSTRACT

Coatings of increased strength and reduced tackiness are anodically electrodeposited on metal sheets, and particularly alkali-cleaned aluminum sheets, by passing a unidirectional electrical current through an aqueous bath having dispersed therein carboxyl-functional copolymer particles and heat-hardening formaldehyde condensate for curing the same, and then through the metal sheet as anode to deposit a coating, and especially a clear coating, on the metal sheet. The copolymer particles are provided by copolymerization in the presence of free radical polymerization catalyst of monoethylenic carboxylic acid in an aqueous dispersion of the monomers in a liquid mixture containing at least 0.5% by weight of polyhydric alcohol having a molecular weight in the range of about 300 to about 6000, the copolymerization providing copolymer particles having an average molecular weight in the range of 10,000 to 50,000 and an acid value of 3-200. The copolymer particles are at least partially neutralized with a base to provide a bath pH of 6 or higher and electrodeposited coatings can be baked to cure the coating and provide a coated metal sheet in which the cured coating has sufficient strength to allow it to be permanently deformed. It is also possible to mechanically remove surface water from the electrodeposited coating and then to overcoat the same and cure the primer coating and the topcoating in a single baking operation.

18 Claims, No Drawings

ELECTRODEPOSITION OF HIGH MOLECULAR WEIGHT COPOLYMERS

The present invention relates to the electrodeposition of relatively high molecular weight copolymers from an aqueous medium onto the anode of a unidirectional electrical system in order to form a coating thereon. This application is related to our prior application, Ser. No. 282,167, filed Aug. 21, 1972, and now abandoned.

It is well known to form acidic copolymers of monoethylenically unsaturated monomers, including a carboxyl-functional monomer, by polymerization in organic solvent solution. These acidic copolymers are dispersed in an aqueous medium using an amino compound which forms a salt with the carboxyl groups in the copolymer. A unidirectional electrical current is then passed through the aqueous medium to cause the acidic copolymer to deposit upon a conductive object to be coated which is made to constitute the anode. A curing agent, such as an aminoplast resin, is codeposited with the acidic copolymer, and the coated anode is removed from the aqueous medium, rinsed, and baked to cure the coating. Unfortunately, the relatively low molecular weight of the copolymer formed by polymerization in organic solvent solution causes many problems, and some of these will now be described.

First, the cured films tend to be weak and tacky, and reflow during curing causes pulling away from sharp edges, especially in the absence of pigmentation, which is why most commerical electrocoating operations involve pigmented coatings. The presence of surface tackiness is self-evidently objectionable, but the weakness of the film is especially evident when it is desired to coat the substrate and subsequently permanently deform it. This is because the low molecular weight copolymer lacks the toughness to resist bending and impact forces. One can enhance flexibility by using ester monomers which plasticize the copolymer, but this aggravates surface tackiness. Pigmentation strengthens the film, but this adds unnecessary expense, particularly in a primer which is overcoated, and corrosion resisting pigments like chromates create electrocoating difficulty while lead silicochromate is costly.

The use of pigmentation is also detrimental where one desires to retain the metallic appearance, or where the significance of improving corrosion resistance has less importance, as in the electrocoating of aluminum where the oxidizing environment created at the anode provides an anodized surface on the aluminum substrate. This is particularly important when alkali cleaning is used in place of the usual chromate rinsing in order to minimize pollution problems.

Second, the uncured wet film is especially weak, so it is difficult to mechanically remove surfacce water from the wet coating, as by wiping. This is important when one intends to overcoat the uncured film while it is still wet. Extraneous surface water interferes with the topcoat, and it is not practical to simply wait fors this extra water to dry since this greatly lengthens the coating line. The aminoplast cure strengthens the coating considerably, so the weakness induced by low molecular weight is particularly evident before the aminoplast cure takes place.

Third, and because of the weakness in the uncured wet film, if one attempts to overcoat a wet primer film with a wet topcoat, in order that both coatings might be cured with a single baking operation, the topcoat can damage the primer unless it has sufficient mechanical integrity. The problem of damaging the primer is particularly acute when the topcoat is a water based topcoat.

Thus, a feature of the present invention is a method in which a water based topcoat is applied over a wet electrocoated primer coat after wiping to remove accumulations of surface water therefrom and provide a uniformly wet surface, with both of the superposed wet coatings being cured with a single baking operation.

The capacity to employ a single baking operation with both the primer coat and the topcoat, especially when the topcoat is deposited from aqueous medium, has obvious advantage, but it has not hitherto been feasible. This lack of success appears to be due to surface water nonuniformly distributed over the wet primer and to a lack of integrity in the primer to allow it to resist the water in the topcoat. As a result, and when a single baking operation was attempted, blisters would form and a wrinkled and useless coating results.

In accordance with the present invention, we have found that when the primer coat is an acidic dispersion of the type disclosed in Sekmakas U.S. Pat. No. 3,862,075, issued Jan. 21, 1975, electrodeposited at the anode from aqueous medium, the mere removal of surface water from the electrodeposited coating is sufficient to permit a topcoat, and especially an aqueous topcoat, to be applied over the wet primer coat, and the two superposed coatings to be satisfactorily cured with a single baking operation. This primer coat may be unpigmented and the surface water can be removed by wiping. Moreover, the substrate may be aluminum, and preferably alkali-cleaned aluminum, so that the unpigmented coating will still provide good resistance to corrosion. Also and regardless of the use of a topcoat, flat substrates may be coated and cured and then permanently deformed to desired shape.

Referring first to the dispersions which are electrodeposited to constitute the wet primer coat, monoethylenic monomers including from about 1 to about 30% by weight of monoethylenic carboxylic acid (preferably at least 3% of said acid), are placed in solution in a liquid mixture containing at least 0.5% by weight, based on monomers, of a low molecular weight, polyhydric alcohol having a molecular weight of from about 300 up to about 6000, and the liquid mixture so-obtained is dispersed in water and polymerized using agitation at an elevated polymerization temperature in the presence of a free radical polymerization catalyst. After polymerization has been completed, a base, preferably an amine, is added to the dispersion to at least partially neutralize the acid content of the copolymer. A small amount of volatile organic solvent, such as 2-ethoxy ethanol, may be added to assist particle coalescence after electrodeposition. The copolymer particles produced in this way normally have an average diameter in the range of 0.5–5 microns, and the copolymer possesses medium molecular weight in the range of 10,000 to 50,000.

As pointed out in said Sekmakas patent, the polyhydric alcohol is preferably an aliphatic polyether having a molecular weight in the range of 350 to 5000, and is present in an amount up to about 50% of the monomers copolymerized. The preferred proportion of polyhydric alcohol on the same basis is from 4–25%, most preferably from 5–20%. Particularly preferred polyhydric alcohols are polyether derivatives of trihydric or tetrahydric alcohols such as glycerine, trimethylol propane, or pentaerythritol formed by adduction with ethylene oxide or propylene oxide.

When a persulfate catalyst is used in the aqueous phase to initiate the desired polymerization, as represents conventional practice, then the aqueous dispersion product is passed through a column of particulate anion exchange resin or ultrafiltration is used to remove the anions which remain from the catalyst.

as is conventional, the aqueous dispersion at the desired pH for anodic electrodeposition (pH 6 or higher, preferably 7.5 to 11) and at a resin solids content of from 3 to 20%, preferably 5 to 15%, is ready for the desired electrical application. The pH, the solids content, and the anodic electrodeposition are all conventional, though it should be noted in passing that the electrocoating bath is poorly adapted for other conventional application techniques because it is too dilute.

The copolymer dispersion which is electrodeposited preferably has added thereto a water soluble or dispersible heat-hardening formaldehyde resin which may be a phenolic resin or, more preferably, an aminoplast resin. Water dispersible aminoplasts are well known in the art and are preferred. Aminoplast proportions are conventional, but are usually in the range of 2 to 40%, preferably 5 to 25%, based on the total weight of resin.

It is particularly preferred to employ copolymers of low acidity, e.g., those having an acid value as low as 3, but preferably in the range of 12 to 80. Higher acidity, up to about an acid value of 200, is permissible, but less preferred.

The monomers which may be used, the polyhydric alcohols and their proportions, and the details of the dispersion polymerization process are all more fully set forth in the commonly owned Sekmakas patent referred to previously and which is hereby incorporated by reference.

The electrodeposition process is itself conventional, the unidirectional electrical current being passed through the aqueous dispersion and through the object to be coated as the anode to cause the copolymer particles to be electrophoretically transported to and deposited upon the anode as a high solids content coating with the copolymer being in polyanionic form. The copolymer carries with it the aminoplast resin and any pigmentation which may have been incorporated in the aqueous electrodeposition bath. The cations provided by the base are largely removed by the electrical current and the aminoplast resin may contain carboxyl groups to assist in its migration to the anode, though this is not essential.

The electrocoated substrate is removed from the bath and the excess aqueous liquor on the substrate is mechanically removed. If the substrate is a continuous strip, a roller may be used or the excess liquor can be removed by simply blowing it off, or a rubber wiper can be used. The superior strength of the wet electrodeposited films of this invention is important to effective mechanical removal of surface water.

While ordinary organic solvent solution topcoats can be applied to the wet electrodeposited films of this invention, it is preferred to use an aqueous coating which deposits a film which thermosets on baking. Aqueous emulsion topcoats are particularly preferred. These may be applied to the wet primer coat from which the surface water has been removed in any desired fashion, as by spraying, brushing, roll coating, and the like.

While it is preferred to employ aqueous emulsions for the topcoat, it is also permissible, in accordance with this invention, to employ any aqueous coating composition based upon a water soluble or water dispersible resin or resin mixture. Of these, the thermosetting systems in which the resin is dispersed through salt formation between a base and carboxyl functionality included in the resin are particularly preferred, especially those which cure through the condensation reaction of the N-methylol group which may react with itself, or more preferably, with hydroxy functionality contained in the resin. Thus, copolymers of monoethylenic monomers including carboxyl functionality for water dispersibility and hydroxy functionality can be cured by admixture with a water soluble or water dispersible aminoplast resin. The aminoplast resin may be omitted in which case the N-methylol group is incorporated in the carboxyl functional resin as by the copolymerization therein of N-methylol acrylamide and the like. Of course, the acrylamide or methacrylamide or like carboxylic acid amide can be copolymerized directly and the copolymer subsequently reacted with formaldehyde to generate the N-methylol group in situ. The hydroxy funcationality may be omitted, and the N-methylol group used for self cure, but this is less desirable.

As previously indicated, the application of aqueous emulsion topcoats is particularly preferred since these are most economical, but organic solvent solution topcoats are also useful. When aqueous emulsion topcoats are used, it is preferred to include in the aqueous emulsion copolymer a small proportion of amine and hydroxy functionalities as aprticularly illustrated in the patents of Sekmakas U.S. Pat. Nos. 3,356,653, 3,356,654, 3,356,655 and 3,509,085, the disclosures of which are hereby incorporated by reference.

In the Sekmakas patents referred to above, monoethylenically unsaturated monomers are copolymerized in aqueous emulsion with from 0.1 to 15% by weight of the copolymer, of a monoethylenically unsaturated hydroxy amine. Any of the unsaturated hydroxy amines noted in said patents may be utilized herein, preferred proportions being from 1–5% by weight thereof, based on the copolymer. The copolymer may also include monoethylenically unsaturated carboxylic acids in an amount up to 5% by weight of the copolymer, and small proportions of monoethylenically unsaturated hydroxy compounds and monoethylenically unsaturated epoxy compounds may optionally be present.

The bulk of the copolymer is constituted by monoethylenically unsaturated monomers having no functional group other than the $CH_2=C<$ group, these being illustrated particularly by mixtures of ethyl acrylate and methyl methacrylate which are preferred because they provide outstanding properties of exterior durability. Small proportions, up to about 5% by weight, of materials having other functional groups than those noted hereinbefore may be used as illustrated by acrylamides or amino acrylates such as dimethyl amino ethyl methacrylate.

These emulsions are stabilized with a base, typically ammonium hydroxide, or an amine, such as triethyl amine. However, the base does not dissolve the emulsion copolymer. The emulsions may include small amounts of organic solvent for various purposes, but these will not normally exceed 10% of the weight of the emulsion polymer.

It is also permissible to add to the aqueous emulsions noted above, a minor proportion (2–40% by weight of total resin solids) of water soluble or water dispersible aminoplast resin such as hexamethoxymethyl melamine in order to provide a degree of cure for the emulsion topcoat.

Still further, the topcoat may be pigmented or include flow control agents or other modifying materials as is conventional in the application of water coatings.

The invention is illustrated in the following examples, in which all parts are by weight, unless otherwise specified.

EXAMPLE 1

Preparation of Acrylic-Melamine Dispersion for Electrocoating

An acrylic dispersion was prepared and modified with 25% (based on resin solids) of a water dispersible partially ethylated methylated hexamethylol melamine. American Cyanamid product XM-1116 is a commercial product which may be used.

The details of preparation are as follows:

Charge Composition—Parts by weight 650 deionized water
0.65 ammonium persulfate

Charge to reactor and heat to 90° C. Then prepare a monomer premix consisting of the following:
240 sytrene
50 polyhydric alcohol (see note 1)
30 acrylic acid
220 ethyl acrylate Note 1—Liquid trihydric polyoxypropylene derivative of trimethylol propane having an average molecular weight of 2540, an hydroxyl number (KOH/g.) of 63, and a viscosity at 25° C. of 440 centipoises.

Then prepare a catalyst premix consisting of:
480 deionized water
2.5 ammonium persulfate Add the monomer premix and the catalyst premix solution to the reactor, simultaneously, over a 2 ½ hour period at 90° C. When addition is complete, hold temperature at 90° C. for 1 ½ hours. Cool to 30° C. and neutralize with the following solution:
60 dimethyl ethanol amine
100 deionized water The copolymer has an acid number of 38.1, and a resin solids content of 30.8%.

Then add the following to provide the final dispersion:
180 Partially ethylated methylated hexamethylol melamine
120 2-butoxy ethanol
100 deionized water The dispersion was diluted to 15% solids with water and passed through an anionic ion exchange column to remove water soluble salts (residue from ammonium persulfate catalyst). The treated dispersion was then diluted to 10% solids having a pH of 10.1, and a conductivity of 750 micromho $Cm^{-1}$. Electrodeposition on an aluminum panel at 125 volts applied for 3 seconds deposited a primer film having a thickness of 0.2–0.3 mil. Adherent liquor is removed by wiping with a rubber squeegee to provide a wet primed panel ready for topcoating.

EXAMPLE 2

Preparation of Ethylenically Unsaturated Amino Alcohol For Use In Preparation of Emulsion Polymer Charge Composition 729 grams (7 moles) aminoethyl ethanolamine
420 grams (7 moles) urea Charge the above to reactor and heat to 240°–250° F. in 1 ½ hours. Hold for 1 hour. Then increase temperature to 390° F. in 2 hours. Hold for 2 hours. (theoretical $NH_3$, 238 grams. Actual loss, 243 grams).

686 grams butyl alcohol—Add.
7.8 grams benzyl trimethyl ammonium chloride (60% solution in water).—Add.
550 grams propylene oxide—Add propylene oxide over 2-2 ½ hours at 235°–240° F. Hold for an acid value less than 5.

The final characteristics of the product are:

Solids: 80.5%
Viscosity (Gardner-Holdt): W
Acid value: 3.9.

EXAMPLE 3

Preparation of Emulsion Polymer

Ingredient A 540 grams water
1 gram sodium bicarbonate
3 grams potassium persulfate
With nitrogen blanket, heat the above to 170° F. using agitation.

Ingredient B 200 grams water
8 grams sodium lauryl sulfate
24 grams nonylphenoxy polyethylene ethanol
Dissolve the above surfactants in the 200 grams of water. Add water-emulsifier Solution "B" to the monomer blend "C" set forth below, using fast speed agitation.

Ingredient C 640 grams ethyl acrylate
310 grams methyl methacrylate
25 grams product of Example 2
10 grams glacial methacrylic acid Ingredient D 340 grams water
Add Ingredients B+C+D to reactor (Ingredient A) over a 2½ hour period at 170°–175° F. Add water "D" using fast speed agitation. Then cool to 90° F.
25 grams ammonium hydroxide (29%)
30 grams water
Add to emulsion to adjust pH to 9.5–10.0 using agitation. Strain through cheesecloth.

The final characteristics of the water emulsion are:

Solids, percent: 46.7
Viscosity (#4 spindle at 40 rpm, Brookfield), cps.: 36
pH: 9.9

EXAMPLE 4

Hexamethoxy methyl melamine is added to the emulsion of hexamethoxy methyl melamine based on the total weight of resin and the emulsion is pigmented with titanium dioxide rutile to provide a pigment to binder ratio of 1:1.

EXAMPLE 5

The wet primed panels produced in Example 1 are roll coated with the water based emulsion topcoat composition of Example 4, and the prime coated and topcoated panels so-provided are then baked in an oven at 500° F. for about 55 seconds which produces a peak metal temperature of 420° F. The total film thickness on the baked panel is in the range of 1.0–1.1 mil.

The cured topcoat is glossy and hard and strongly adhered to the primer coat. The coatings are smooth and blister free.

We claim:

1. A method of electrodepositing a primer on a substrate and then overcoating said primed substrate while the primer is still wet so that both primer and topcoat can be cured in a single baking operation comprising, anodically electrodepositing a film characterized by increased strength and reduced tackiness on a metal sheet by passing a unidirectional electrical current through an aqueous bath having dispersed therein carboxyl-functional copolymer particles and heat-hardening formaldehyde condensate for curing the same and then through said metal sheet as anode to deposit a primer coating on said metal sheet, said copolymer particles being provided by copolymerization in the presence of free radical polymerization catalyst of monoethylenic monomers including from about 1% to about 30% by weight of monoethylenic carboxylic acid in an aqueous dispersion of said monomers in a liquid mixture containing at least 0.5% by weight of polyhydric alcohol having a molecular weight in the range of about 300 to about 6000, said copolymerization providing copolymer particles having an average molecular weight in the range of 10,000 to 50,000 and an acid value of 3–200, said copolymer particles being at least partially neutralized with a base to provide a bath pH of 6 or higher, removing the primer coated metal sheet from said bath, wiping the wet surface of the electrodeposited primer coating to mechanically remove accumulations of surface water therefrom and provide a uniformly wet surface, applying over said uniformly wet surface a resinous topcoat and then curing said primer and topcoat in a single baking operation.

2. A method as recited in claim 1 in which said aqueous bath includes from 2–40% of aminoplast resin based on the total weight of resin.

3. A method as recited in claim 1 in which said carboxyl-functional copolymer particles have an acid value in the range of 12–80 and said bath includes volatile amine providing a bath pH in the range of 7.5–11.

4. A method as recited in claim 3 in which said aqueous bath has a resin solids content in the range of 3–20%.

5. A method as recited in claim 4 in which said aqueous bath has a resin solids content in the range of 5–15% and said bath includes from 5–25% of aminoplast resin based on the total weight of resin.

6. A method as recited in claim 1 in which said carboxyl-functional copolymer includes at least 3% by weight of copolymerized monoethylenically unsaturated carboxylic acid.

7. A method as recited in claim 1 in which said polyhydric alcohol is a trihydric or tetrahydric alcohol having a molecular weight in the range of 350 to 5000.

8. A method as recited in claim 1 in which said metal sheet is flat and said topcoat is applied in the form of a water-based coating.

9. A method as recited in claim 8 in which said water-based coating is an aqueous emulsion.

10. A method as recited in claim 9 in which the aqueous emulsion is constituted by an aqueous emulsion copolymer containing amino and hydroxy functionalities.

11. A method as recited in claim 9 in which said water-based coating comprises an aminoplast resin and a carboxyl-functional emulsion copolymerized copolymer in salt form having hydroxyl groups for cure with said aminoplast resin.

12. A method as recited in claim 11 in which said emulsion copolymer contains 0.1–15% of monoethylenically unsaturated hydroxy amine, up to 5% of monoethylenically unsaturated carboxylic acid, and the balance of the copolymer consisting essentially of monoethylenically unsaturated monomers having no functional group other than the $CH_2=C<$ group.

13. A method as recited in claim 12 in which said unsaturated monomer having no functional group other than the $CH_2=C<$ group is constituted by a mixture of ethyl acrylate and methyl methacrylate.

14. A method as recited in claim 1 in which the said aqueous bath is unpigmented to deposit a clear primer coating.

15. A method as recited in claim 14 in which said metal sheet is aluminum.

16. A method as recited in claim 15 in which said aluminum is alkali-cleaned.

17. A method as recited in claim 1 in which said free radical polymerization catalyst comprises a persulfate and anions are removed from the aqueous dispersion after copolymerization to minimize the anion content of said bath.

18. A method as recited in claim 1 in which said aqueous bath has a resin solids content in the range of 3–20% and contains from 2–40% of aminoplast resin, based on the total weight of resin, and said carboxyl-functional copolymer particles have an acid value in the range of 12–80 and are neutralized with volatile amine to provide a bath pH in the range of 7.5–11.

* * * * *